(12) United States Patent
Yamato et al.

(10) Patent No.: US 7,846,865 B2
(45) Date of Patent: Dec. 7, 2010

(54) CATALYST FOR PURIFYING EXHAUST GAS

(75) Inventors: Masanori Yamato, Toyota (JP); Oji Kuno, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/373,926

(22) PCT Filed: Jul. 20, 2007

(86) PCT No.: PCT/JP2007/064358
§ 371 (c)(1),
(2), (4) Date: Jan. 15, 2009

(87) PCT Pub. No.: WO2008/010576
PCT Pub. Date: Jan. 24, 2008

(65) Prior Publication Data
US 2009/0197764 A1     Aug. 6, 2009

(30) Foreign Application Priority Data
Jul. 20, 2006    (JP)   ............................. 2006-198471

(51) Int. Cl.
*B01J 23/00* (2006.01)
*B01J 21/00* (2006.01)
*B01J 20/00* (2006.01)

(52) U.S. Cl. .................. 502/327; 502/261; 502/262; 502/304; 502/326; 502/332; 502/333; 502/334; 502/339; 502/349; 502/350; 502/351; 502/415; 502/439; 502/527.19

(58) Field of Classification Search ................. 502/326, 502/327, 332, 333, 334, 339, 415, 439, 527.19, 502/261, 262, 304, 349, 350, 351
See application file for complete search history.

(56) References Cited

U.S. PATENT DOCUMENTS

| | | | |
|---|---|---|---|
| 5,376,610 A | | 12/1994 | Takahata et al. |
| 5,459,119 A | * | 10/1995 | Abe et al. .................... 502/326 |
| 5,525,307 A | * | 6/1996 | Yasaki et al. ................ 422/171 |
| 5,556,825 A | * | 9/1996 | Shelef et al. ................ 502/303 |
| 5,597,771 A | * | 1/1997 | Hu et al. ..................... 502/304 |
| 5,948,377 A | * | 9/1999 | Sung ....................... 423/213.5 |
| 5,989,507 A | * | 11/1999 | Sung et al. ............... 423/213.5 |
| 6,047,544 A | * | 4/2000 | Yamamoto et al. ............ 60/285 |
| 6,087,298 A | * | 7/2000 | Sung et al. ................... 502/333 |

(Continued)

FOREIGN PATENT DOCUMENTS

EP    0 566 401 A1    10/1993

(Continued)

*Primary Examiner*—Cam N Nguyen
(74) *Attorney, Agent, or Firm*—Finnegan, Henderson, Farabow, Garrett & Dunner, LLP

(57) ABSTRACT

In the present invention, it is an assignment to optimize a loading density of noble metal on catalyst.

Pt is loaded in such an amount that a loading amount per 1 liter of a support substrate exceeds 0.75 g on an exhaust-gas upstream side of a coating layer, and a loading density of Rh in the coating layer is made so that it becomes higher on an exhaust-gas downstream side than on the exhaust-gas upstream side. The purifying performance after warming up improves by loading Rh with high density on the exhaust-gas downstream side that is likely to become rich atmosphere.

6 Claims, 3 Drawing Sheets

U.S. PATENT DOCUMENTS

| | | | |
|---|---|---|---|
| 6,335,305 B1 * | 1/2002 | Suzuki et al. | 502/325 |
| 6,375,910 B1 * | 4/2002 | Deeba et al. | 423/239.1 |
| 6,634,168 B1 * | 10/2003 | Yamamoto | 60/285 |
| 6,667,018 B2 * | 12/2003 | Noda et al. | 423/213.5 |
| 6,764,665 B2 * | 7/2004 | Deeba et al. | 423/239.1 |
| 6,777,370 B2 * | 8/2004 | Chen | 502/241 |
| 6,806,225 B1 * | 10/2004 | Ikeda et al. | 502/326 |
| 6,846,466 B2 * | 1/2005 | Matsumoto et al. | 422/180 |
| 6,881,384 B1 * | 4/2005 | Uenishi et al. | 422/177 |
| 6,967,186 B2 * | 11/2005 | Takaya et al. | 502/325 |
| 7,045,483 B2 * | 5/2006 | Noda et al. | 502/243 |
| 7,056,859 B2 * | 6/2006 | Hachisuka | 502/327 |
| 7,071,141 B2 * | 7/2006 | Gandhi et al. | 502/302 |
| 7,204,965 B2 * | 4/2007 | Okawara et al. | 422/177 |
| 7,276,212 B2 * | 10/2007 | Hu et al. | 422/177 |
| 7,374,729 B2 * | 5/2008 | Chen et al. | 422/177 |
| 7,524,465 B2 * | 4/2009 | Kumar et al. | 422/180 |
| 7,576,031 B2 * | 8/2009 | Beutel et al. | 502/339 |
| 7,585,478 B2 * | 9/2009 | Shirahata et al. | 423/213.5 |
| 7,737,077 B2 * | 6/2010 | Kitamura et al. | 502/326 |
| 2006/0270550 A1 * | 11/2006 | Shimizu et al. | 502/325 |
| 2008/0044330 A1 * | 2/2008 | Chen et al. | 423/213.5 |
| 2008/0081761 A1 * | 4/2008 | Suzuki | 502/304 |

FOREIGN PATENT DOCUMENTS

| | | |
|---|---|---|
| EP | 0 622 107 A2 | 11/1994 |
| JP | 63-168032 | 11/1988 |
| JP | 5-293376 | 11/1993 |
| JP | 6-198181 | 7/1994 |
| JP | 8-332350 | 12/1996 |
| JP | 10-174866 | 6/1998 |
| JP | 2001-252565 | 9/2001 |
| JP | 2004-16931 | 1/2004 |
| JP | 2004-181374 | 7/2004 |
| JP | 2006-231204 | 9/2006 |
| JP | 2007-38072 | 2/2007 |
| WO | WO 2007/015387 A1 | 2/2007 |

* cited by examiner

CATALYST FOR PURIFYING EXHAUST GAS

CROSS-REFERENCE TO RELATED APPLICATIONS

This application is a national phase application of International Application No. PCT/JP2007/064358, filed Jul. 20, 2007, and claims the priority of Japanese Application No. 2006-198471, filed Jul. 20, 2006, the contents of both of which are incorporated herein by reference.

TECHNICAL FIELD

The present invention relates to a catalyst for purifying exhaust gas, catalyst which can purify harmful components in exhaust gases from internal combustion engines, and the like, efficiently from low-temperature region to high-temperature region.

BACKGROUND ART

Conventionally, as a catalyst for purifying the exhaust gases of automobiles, three-way catalysts have been used, three-way catalysts which carry out the oxidation of CO and HC in the exhaust gases and the reduction of $NO_x$ therein simultaneously at the theoretical air-fuel ratio (stoichiometry), thereby purifying them. As for such a three-way catalyst, the following has been known widely, for instance: a coating layer is formed from a porous oxide, such as γ-alumina, on a heat-resistant substrate comprising cordierite, and the like, and then a noble metal, such as platinum (Pt) and rhodium (Rh), is loaded on the coating layer.

This three-way catalyst functions as an oxidizing catalyst mainly in lean atmosphere; and functions as a reducing catalyst as well in atmospheres from stoichiomeric to rich atmosphere, and can thereby purify $NO_x$ by reducing them by means of CO and HC in the exhaust gases.

By the way, although the loaded noble metal demonstrates the catalytic actions in the three-way catalyst, since the temperature region over which the catalytic actions of the noble metal are demonstrated lies in high-temperature region comparatively, there has been such a problem that it is less likely to purify the harmful components in low-temperature region. Accordingly, when the exhaust gases fall in low-temperature region in winter, at the time of start up, and the like, there has been such a drawback that the purifying activities are low.

Hence, it has been carried out to load the noble metal with high density onto the upstream portion to which the exhaust gases flow in. By means of thus loading the noble metal with high density onto the upstream portion, the probability of the noble metal contacting with the exhaust gases enhances, and thereby the probability of the oxidation reactions of CO and HC taking place enhances. And, when the oxidation reactions take place once, the ignition propagates so that the oxidation reactions proceed furthermore. Moreover, since the oxidation reactions are exothermic reactions, there is also such an action that the three-way catalyst is heated by means of the reaction heats to undergo temperature increment so that it undergoes temperature increment to the activation-temperature region of the noble metal quickly. Therefore, when loading the noble metal with high density onto the upstream portion, the purifying activities in low-temperature region improve by means of the synergic effect of these.

For example, in Japanese Unexamined Patent Publication (KOKAI) Gazette No. 2004-181,374, there is a description on loading a noble metal more onto an upstream-side catalyst than onto a downstream-side catalyst in a tandem catalyst in which the two catalysts are put in position in series. Moreover, in Japanese Unexamined Patent Publication (KOKAI) Gazette No. 2001-252,565, there is a description on a catalyst in which an upper-layer coating layer is further formed on a surface of a coating layer's upstream portion to which exhaust gases flow in. In accordance with this catalyst, it is possible to make the loading density of the noble metal on the upstream portion higher by means of the noble metal that is loaded on the upper-layer coating layer.

However, when simply making the loading density of the noble metal higher, there is such a problem that the absolute amount of the noble metal increases so that the cost has risen. Moreover, when making the loading density of the upstream-side noble metal higher, the HC purifying performance in low-temperature region improves. However, even when making the loading density of the upstream-side noble metal higher, it hardly affects the purifying performance after the temperature of the catalyst rises up to the activation temperature of the noble metal (hereinafter, referred to as "after warming up"), and accordingly the noble metal has been wasted. Moreover, there is even such a problem that the $NO_x$ purifying performance after warming up is not sufficient.

Patent Literature No. 1: Japanese Unexamined Patent Publication (KOKAI) Gazette No. 2004-181,374; and Patent Literature No. 2: Japanese Unexamined Patent Publication (KOKAI) Gazette No. 2001-252,565

DISCLOSURE OF THE INVENTION

Assignment to be Solved by the Invention

The present invention is one which has been done in view of the aforementioned circumstances, and it is an assignment to be solved to optimize a loading density of noble metal on catalyst.

Means for Solving the Assignment

A characteristic of a catalyst for purifying exhaust gas according to the present invention which solves the aforementioned assignment lies in that, in a catalyst for purifying exhaust gas, the catalyst comprising: a support substrate; and a coating layer being formed on a support-substrate surface, the coating layer comprising: a porous oxide support; and noble metals being loaded on the porous oxide support and including Pt and Rh at least;

Pt is loaded in such an amount that a loading amount per 1 liter of the support substrate exceeds 0.75 g on an exhaust-gas upstream side of the coating layer, and additionally Rh is loaded; and a loading density of Rh in the coating layer is higher on an exhaust-gas downstream side than on the exhaust-gas upstream side.

It is desirable that a ratio of a loading amount of Rh on the exhaust-gas upstream side with respect to a loading amount of Rh on the exhaust-gas downstream side can be 0.9 or less, and it is further desirable that it can be 0.5 or less.

Moreover, it is preferable that a loading density of Pt in the coating layer can be higher on the exhaust-gas upstream side than on the exhaust-gas downstream side. And, it is desirable that a ratio of a loading amount of Pt on the exhaust-gas upstream side with respect to a loading amount of Pt on the exhaust-gas downstream side can be 0.8 or more, and it is further desirable that it can be 1.4 or more.

Effect of the Invention

Hereinafter, an exhaust-gas upstream side will be referred to as an "upstream side," and an exhaust-gas downstream side will be referredtoas a "downstream side " In accordance with the catalyst for purifying exhaust gas according to the present invention, a loading density of Rh is higher on a downstream side than on an upstream side. Rh is good in terms of the purifying activity of $NO_x$ in rich atmosphere that lacks oxygen. And, since HC and CO are oxidized on the upstream side so that oxygen is consumed, exhaust gases that flow into catalyst are likely to turn into rich atmosphere on the downstream side. Therefore, by loading Rh onto the downstream side with high density, the $NO_x$ purifying performance after warming up improves.

Moreover, loading Rh onto the downstream side with high density suffices, and it is allowable that the loading density of Rh on the upstream side can be low. Therefore, it is allowable that the loading amount of Rh can be equivalent to those having been done conventionally, and accordingly there is not any enlargement of costs, either.

Further, when Pt is loaded onto the upstream side with high density, the purifying performance of HC and CO in low-temperature region improves. And, even when Pt is loaded onto the downstream side with low density, there is hardly any influence on the purifying activities after warming up. Therefore, it is allowable that the loading amount of Pt can also be equivalent to those having been done conventionally, and accordingly the enlargement of costs can be suppressed.

EXPLANATION ON REFERENCE NUMERALS

Figure 1:
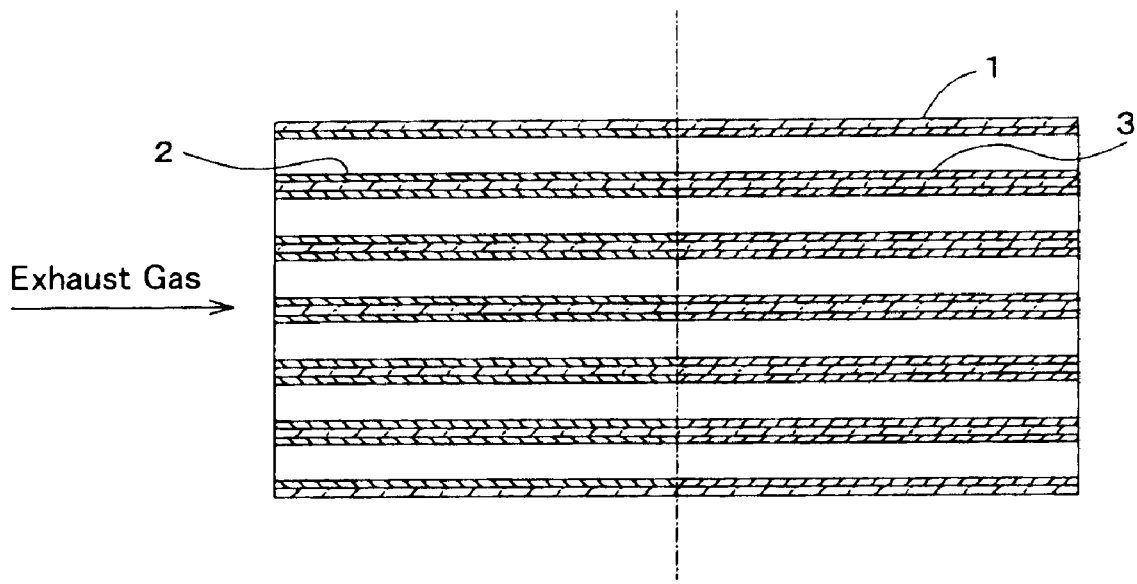
FIG. 1 is a schematic cross-sectional diagram of a catalyst that is directed to an example according to the present invention.

1: Honeycomb Substrate;
2: Upstream-side Coating Layer;
3: Downstream-side Coating Layer

BEST MODE FOR CARRYING OUT THE INVENTION

A catalyst for purifying exhaust gas according to the present invention comprises a support substrate, and a coating layer being formed on a surface of the support substrate. As for the support substrate, those with general honeycomb configurations or foamed configurations can be exemplified, and it is possible to use those which are formed of heat-resistant ceramic, such as cordierite, or of metallic foil.

The coating layer is constituted of a porous oxide support, and noble metals being loaded on the porous oxide support and including Pt and Rh at least. As for the porous oxide support, it is possible to use those which have been used in conventional catalysts for purifying exhaust gas, such as alumina, zirconia, silica, titania, ceria and ceria-zirconia.

It is desirable to form the coating layer in an amount of 100-300 g per 1 liter of the support substrate. When the forming amount of the coating layer is less than this range, there might arise a case where the loading density of the noble metals becomes too high so that granular growth might arise in service. Moreover, when making the loading amounts of the noble metals less, the conversion rates might decline. In addition, when the forming amount of the coating layer becomes greater than this range, the heat capacity increases so that the warm-up characteristic might deteriorate, and thereby the purifying performance in low-temperature region might decline. Moreover, there might arise a case where the drawback, such as the coming-off, occurs because of the vibrations, and the like, in service.

It is possible to form this coating layer by forming a slurry from a powder of the porous oxide support, a binder, such as alumina sol, and a solvent, such as water; calicining this slurry after wash coating it onto the support substrate; and then loading the noble metals onto it. Alternatively, it is allowable to turn a catalytic powder, in which the noble metals have been loaded on a powder of the porous oxide support in advance, into a slurry and then wash coat it.

A major characteristic of the present invention lies in the loading distribution of the noble metals; in the present invention, it is constituted so that: Pt is loaded in such an amount that a loading amount per 1 liter of the support substrate exceeds 0.75 g on an upstream side of the coating layer, and additionally Rh is loaded; and a loading density of Rh in the coating layer becomes higher on a downstream side than on the upstream side.

Here, the "upstream side" refers to that a range of a length heading from an exhaust-gas inlet-side end surface to an outlet-side end surface falls in a range of $\frac{1}{8}$-$\frac{1}{2}$ with respect to an overall length of the support substrate. Therefore, the "downstream side" becomes as follows: a range of a length heading from the exhaust-gas outlet-side end surface to the inlet-side end surface falls in a range of $\frac{1}{2}$-$\frac{7}{8}$ with respect to the overall length of the support substrate. When the upstream-side range is less than $\frac{1}{8}$ with respect to the overall length, or when the downstream-side range exceeds $\frac{7}{8}$ with respect to the overall length, it results in lacking the purifying performance in low-temperature region. Moreover, when the upstream-side range exceeds $\frac{1}{2}$ with respect to the overall length, or when the downstream-side range is less than $\frac{1}{2}$ with respect to the overall length, it results in lacking the purifying performance after warming up.

Note that it is allowable to adapt the catalyst for purifying exhaust gas according to the present invention into a tandem structure in which two catalysts are put in series; or it is allowable to adapt it into a zone-coated structure in which distinct coating layers are formed on the upstream side and downstream side of one support substrate, respectively.

And now, in the catalyst for purifying exhaust gas according to the present invention, the loading density of Rh in the coating layer is higher on the downstream side than on the upstream side. By doing thus, the purifying performance after warming up improves remarkably; in particular, the purifying performance of $NO_x$ improves. Here, the "loading density of Rh" refers to a mass ratio of Rh being loaded with respect to a mass of the porous oxide support that exists in that domain. It is allowable that the loading density of Rh on the downstream side can fall in a range of 0.001-0.004. When the loading density exceeds 0.004, there might arise a case where it undergoes granular growth in service so that the activities decline.

As for an extent of the difference between the loading density of Rh on the upstream side and that on the downstream side, it is possible to adapt a ratio of the loading amounts into an index. That is, it is desirable that a ratio of the loading amount of Rh on the upstream side with respect to the loading amount of Rh on the downstream side can be 0.9 or less. When this ratio exceeds 0.9, the difference between the upstream-side and downstream-side loading amounts is too small, thereby losing the significance of the high-density loading on the downstream side to result in lacking the purifying performance after warming up. It is further desirable that this ratio can be 0.5 or less.

The loading amount of Rh in the case of general three-way catalyst is 0.1-0.5 g per 1 liter of support substrate, and becomes 0.001-0.004 when being converted into the loading density. When the loading amount of Rh is less than this range, the $NO_x$ purifying performance becomes insufficient; eve when loading it greater than this range, it results in saturating the activities and additionally becoming highly expensive. Therefore, in the catalyst for purifying exhaust gas according to the present invention as well, it is desirable that the sum of the Rh amount on the upstream side and that on the downstream side can fall in this range.

For example, in the case of loading it in a loading amount of 0.4 g/L onto the entire catalyst, it is loaded in an amount of 0.2 g/L on the upstream-side half when it is loaded in an amount of 0.6 g/L on the downstream-side half. In this instance, a ratio of the loading amount of Rh on the upstream side with respect to the loading amount of Rh on the downstream side becomes 0.33. Moreover, when the coating-layer forming amount per 1 liter of the support substrate is 250 g, for instance, the loading density of Rh on the downstream side becomes 0.0024, and the loading density of Rh on the upstream side becomes 0.0008.

Therefore, such a range that the ratio of the loading amount of Rh on the upstream side with respect to the loading amount of Rh on the downstream side is 0.9 or less has the same meaning as, when loading it in a loading amount of 0.4 g/L onto the entirety, for instance, ranges that the Rh loading amount on the downstream side is 0.42 g/L or more and the Rh loading amount on the upstream side is 0.38 g/L or less.

In the catalyst for purifying exhaust gas according to the present invention, Pt is adapted into an indispensable element in addition to Rh, and Pt is loaded on the upstream side in such an amount that a loading amount per 1 liter of the support substrate exceeds 0.75 g. When the upstream-side Pt loading amount is 0.75 g/L or less, the HC purifying performance in low-temperature region becomes insufficient. Note that it is desirable that the loading amount of Pt can fall in a range of 0.5-3 g/L on the entire catalyst.

It is desirable that the loading density of Pt can be higher on the exhaust-gas upstream side than on the exhaust-gas downstream side. By constituting thus, the purifying performance in low-temperature region improves. It is allowable that the loading density of Pt on the upstream side can fall in a range of 0.003-0.03. When the loading density exceeds 0.03, there might arise a case where it undergoes granular growth in service so that the activities decline.

It is desirable that a ratio of the loading amount of Pt on the upstream side with respect to the loading amount of Pt on the downstream side can be 0.8 or more. When this ratio is less than 0.8, the difference between the upstream-side and downstream-side loading amounts is too small, thereby losing the significance of the high-density loading on the upstream side to result in lacking the purifying performance in low-temperature region. It is further desirable that this ratio can be 1.4 or more. Note that the upper limit of this ratio is not limited in particular and can even be infinite.

Note that, in the catalyst for purifying exhaust gas according to the present invention, it is allowable to load another noble metal, such as Pd, or a transition metal, onto the coating layer in such a range that it does not impair the performance.

EXAMPLES

Hereinafter, the present invention will be explained in detail by means of examples and comparative examples.

Example No. 1

In FIG. 1, a schematic cross-sectional diagram of a catalyst for purifying exhaust gas according to a present example is illustrated. This catalyst for purifying exhaust gas comprises a honeycomb substrate 1 (length: 130 mm) being made of cordierite, upstream-side coating layers 2 being formed in a range of 65 mm from the upstream-side end surface of the honeycomb substrate 1, and downstream-side coating layers 3 being formed in a range of 65 mm from the downstream-side end surface of the honeycomb substrate 1. On the upstream-side coating layers 2 and downstream-side coating layers 3, Pt and Rh are loaded with different loading densities, respectively. Hereinafter, the manufacturing method of this catalyst for purifying exhaust gas will be explained, instead of the detailed explanation on the constructions.

A dinitrodiamine platinum solution with a predetermined concentration was used, was adsorption loaded onto a $CeO_2$—$ZrO_2$ solid-solution powder ($CeO_2$:$ZrO_2$=60:40 by weight ratio), was dried at 120° C., and was calcined at 500° C. for 2 hours, thereby preparing a Pt/$CeO_2$—$ZrO_2$ powder (A) on which Pt was loaded in an amount of 1.6% by weight.

A dinitrodiamine platinum solution with a predetermined concentration was used, was adsorption loaded onto a $CeO_2$—$ZrO_2$ solid-solution powder ($CeO_2$:$ZrO_2$=60:40 by weight ratio), was dried at 120° C., and was calcined at 500° C. for 2 hours, thereby preparing a Pt/$CeO_2$—$ZrO_2$ powder (B) on which Pt was loaded in an amount of 0.4% by weight.

A rhodium nitrate aqueous solution with a predetermined concentration was used, was adsorption loaded onto a $CeO_2$—$ZrO_2$ solid-solution powder ($CeO_2$:$ZrO_2$=25:75 by weight ratio), was dried at 120° C., and was calcined at 500° C. for 2 hours, thereby preparing an Rh/$CeO_2$—$ZrO_2$ powder (A) on which Rh was loaded in an amount of 0.2% by weight.

A rhodium nitrate aqueous solution with a predetermined concentration was used, was adsorption loaded onto a $CeO_2$—$ZrO_2$ solid-solution powder ($CeO_2$:$ZrO_2$=25:75 by weight ratio), was dried at 120° C., and was calcined at 500° C. for 2 hours, thereby preparing an Rh/$CeO_2$—$ZrO_2$ powder (B) on which Rh was loaded in an amount of 0.8% by weight.

80 parts by mass of Pt/$CeO_2$—$ZrO_2$ powder (A), 80 parts by mass of Rh/$CeO_2$—$ZrO_2$ powder (A), 20 parts by mass of an $Al_2O_3$ powder, 20 parts by mass of an alumina binder, and an adequate amount of water were mixed, thereby preparing a slurry; and then it was wash coated onto the 65-mm position from the exhaust-gas upstream-side end surface of the honeycomb substrate 1 (cellular density: 600 cpsi; wall thickness: 75 μm; diameter: 103 mm; and overall length: 130 mm) that was made of cordierite.

Meanwhile, 150 parts by mass of Pt/CeO$_2$—ZrO$_2$ powder (B), 80 parts by mass of Rh/CeO$_2$—ZrO$_2$ powder (B), 20 parts by mass of an Al$_2$O$_3$ powder, 20 parts by mass of an alumina binder, and an adequate amount of water were mixed, thereby preparing a slurry; and then it was wash coated onto the rest of 65 mm, namely, the 65-mm position from the exhaust-gas downstream-side end surface.

After drying this, it was calcined at 500° C. for 2 hours to form the upstream-side coating layers 2 and downstream-side coating layers 3, thereby preparing a catalyst for purifying exhaust gas according to Example No. 1. In this catalyst for purifying exhaust gas, the upstream-side coating layers 2 were formed in an amount of 250 g/L, and the downstream-side coating layers 3 were formed in an amount of 250 g/L. Moreover, as indicated in Table 1, the loading amount of Pt was 2.4 g/L and the loading amount of Rh was 0.16 g/L in the upstream-side coating layers 2; and the loading amount of Pt was 0.6 g/L and the loading amount of Rh was 0.64 g/L in the downstream-side coating layers 3. On the entire catalyst, Pt was loaded in an amount of 1.5 g/L, and Rh was loaded in an amount of 0.4 g/L, respectively.

Therefore, the loading densities in the upstream-side coating layers 2 were 0.0096 for Pt and 0.00064 for Rh; and the loading densities in the downstream-side coating layers 3 were 0.0024 for Pt and 0.00256 for Rh. Specifically, the loading density of Rh was higher on the downstream side than on the upstream side; and the loading density of Pt was higher on the upstream side than on the downstream side. Moreover, a ratio of the loading amount of Rh on the upstream side with respect to the loading amount of Rh on the downstream side was 0.25; and a ratio of the loading amount of Pt on the upstream side with respect to the loading amount of Pt on the downstream side was 4.

Example No. 2, Reference Example Nos. 1-3 & Comparative Example Nos. 1-10

Except that Pt or Rh was loaded respectively so that the loading amounts differed while using the same CeO$_2$-ZrO$_2$ solid-solution powders as those in Example No. 1, catalytic powders were prepared in the same manner as Example No. 1. And, coating layers were formed similarly onto the same honeycomb substrate as that in Example No. 1, thereby preparing catalysts, whose loading amounts and loading distributions of Pt and Rh differed as indicated in Table 1, respectively. In all of them, on the entire catalyst, Pt came to be loaded in an amount of 1.5 g/L, and Rh came to be loaded in an amount of 0.4 g/L, respectively.

Conventional Example

Except that Pt or Rh was loaded respectively so that the loading amounts differed while using the same CeO$_2$-ZrO$_2$ solid-solution powders as those in Example No. 1, a catalytic powder was prepared in the same manner as Example No. 1. And, coating layers were formed similarly onto the same honeycomb substrate as that in Example No. 1, thereby preparing a catalyst, in which Pt was loaded uniformly on the entirety in an amount of 1.5 g/L, and in which Rh was loaded uniformly on the entirety in an amount of 0.4 g/L, as indicated in Table 1.

Reference Example No. 4 & Comparative Example Nos. 11-18

Except that Pt or Rh was loaded respectively so that the loading amounts differed while using the same CeO$_2$-ZrO$_2$ solid-solution powders as those in Example No. 1, catalytic powders were prepared in the same manner as Example No. 1. And, except that the upstream-side coating layers 2 were formed in a range of 30 mm from the upstream-side end surface of the same honeycomb substrate as that in Example No. 1 and the downstream-side coating layers were formed in a range of remaining 100 mm, thereby preparing catalysts, whose loading amounts and loading distributions of Pt and Rh differed as indicated in Table 2, respectively. In all of them, on the entire catalyst, Pt came to be loaded in an amount of 1.5 g/L, and Rh came to be loaded in an amount of 0.4 g/L, respectively.

<Test-Evaluation>

TABLE 1

| | Upstream-side Coating Layer (65 mm) | | | | Downstream-side Coating Layer (65 mm) | | | | Rh-Loading-Amount Ratio, Upstream Side to Downstream Side | Pt-Loading-Amount Ratio, Upstream Side to Downstream Side | COP, Max. Conversion Rate (%) | 50%-HC Purification Attainable Time (sec.) |
|---|---|---|---|---|---|---|---|---|---|---|---|---|
| | Pt | | Rh | | Pt | | Rh | | | | | |
| | Loading Amount (g/L) | Loading Density | Loading Amount (g/L) | Loading Density | Loading Amount (g/L) | Loading Density | Loading Amount (g/L) | Loading Density | | | | |
| Ex. #1 | 2.4 | 0.0096 | 0.16 | 0.00064 | 0.6 | 0.0024 | 0.64 | 0.00256 | 0.25 | 4 | 96.8 | 24.3 |
| Ref. Ex. #1 | 1.9 | 0.0076 | 0 | 0 | 1.1 | 0.0044 | 0.8 | 0.0032 | 0 | 1.73 | 96.2 | 31.8 |
| Ref. Ex. #2 | 0.95 | 0.0038 | 0 | 0 | 2.05 | 0.0082 | 0.8 | 0.0032 | 0 | 0.46 | 96.7 | 29.8 |
| Ref. Ex. #3 | 3 | 0.012 | 0 | 0 | 0 | 0 | 0.8 | 0.0032 | 0 | ∞ | 96.7 | 30 |
| Ex. #2 | 1.8 | 0.0072 | 0.32 | 0.00128 | 1.2 | 0.0048 | 0.48 | 0.00192 | 0.67 | 1.39 | 96.2 | 25.6 |
| Comp. Ex. #3 | 3 | 0.012 | 0.8 | 0.0032 | 0 | 0 | 0 | 0 | ∞ | ∞ | 91.8 | 22.8 |
| Comp. Ex. #2 | 0 | 0 | 0 | 0 | 3 | 0.012 | 0.8 | 0.0032 | 0 | 0 | 91.8 | 32 |
| Comp. Ex. #3 | 2.25 | 0.009 | 0.6 | 0.0024 | 0.75 | 0.003 | 0.2 | 0.0008 | 3 | 3 | 95.6 | 22 |
| Comp. Ex. #4 | 0.75 | 0.003 | 0.2 | 0.0008 | 2.25 | 0.009 | 0.6 | 0.0024 | 0.33 | 0.33 | 94.3 | 31.8 |
| Comp. Ex. #5 | 1.1 | 0.0044 | 0.8 | 0.0032 | 1.9 | 0.0076 | 0 | 0 | ∞ | 0.58 | 85.2 | 27.4 |

TABLE 1-continued

| | Upstream-side Coating Layer (65 mm) | | | | Downstream-side Coating Layer (65 mm) | | | | Rh-Loading-Amount Ratio, Upstream Side to Downstream Side | Pt-Loading-Amount Ratio, Upstream Side to Downstream Side | COP, Max. Conversion Rate (%) | 50%-HC Purification Attainable Time (sec.) |
|---|---|---|---|---|---|---|---|---|---|---|---|---|
| | Pt | | Rh | | Pt | | Rh | | | | | |
| | Loading Amount (g/L) | Loading Density | Loading Amount (g/L) | Loading Density | Loading Amount (g/L) | Loading Density | Loading Amount (g/L) | Loading Density | | | | |
| Comp. Ex. #6 | 2.05 | 0.0082 | 0.8 | 0.0032 | 0.95 | 0.0038 | 0 | 0 | ∞ | 2.15 | 88.8 | 21.4 |
| Comp. Ex. #7 | 2.45 | 0.0098 | 0.4 | 0.0016 | 0.55 | 0.0022 | 0.4 | 0.0016 | 1.0 | 4.45 | 96.1 | 25 |
| Comp. Ex. #8 | 0.55 | 0.0022 | 0.4 | 0.0016 | 2.45 | 0.0098 | 0.4 | 0.0016 | 1.0 | 0.22 | 96.8 | 28.2 |
| Comp. Ex. #9 | 1.2 | 0.0048 | 0.48 | 0.00192 | 1.8 | 0.0072 | 0.32 | 0.00128 | 1.5 | 0.67 | 96.8 | 24.6 |
| Comp. Ex. #10 | 0 | 0 | 0.8 | 0.0032 | 3 | 0.0012 | 0 | 0 | ∞ | 0 | 94 | 27.6 |
| Conventional Ex. | 1.5 | 0.006 | 0.4 | 0.0016 | 1.5 | 0.006 | 0.4 | 0.0016 | 1.0 | 1 | 96.1 | 25.0 |

TABLE 2

| | Upstream-side Coating Layer (30 mm) | | | | Downstream-side Coating Layer (100 mm) | | | | Rh-Loading-Amount Ratio, Upstream Side to Downstream Side | Pt-Loading-Amount Ratio, Upstream Side to Downstream Side | COP, Max. Conversion Rate (%) | 50%-HC Purification Attainable Time (sec.) |
|---|---|---|---|---|---|---|---|---|---|---|---|---|
| | Pt | | Rh | | Pt | | Rh | | | | | |
| | Loading Amount (g/L) | Loading Density | Loading Amount (g/L) | Loading Density | Loading Amount (g/L) | Loading Density | Loading Amount (g/L) | Loading Density | | | | |
| Ex. #6 | 6.5 | 0.026 | 0 | 0 | 0 | 0 | 0.52 | 0.00208 | 0 | ∞ | 97.7 | 26.6 |
| Comp. Ex. #11 | 3.25 | 0.013 | 0.87 | 0.00348 | 0.98 | 0.00392 | 0.26 | 0.00104 | 3.35 | 3.32 | 94.9 | 18.2 |
| Comp. Ex. #12 | 6.50 | 0.026 | 1.73 | 0.00692 | 0 | 0 | 0 | 0 | ∞ | ∞ | 88.5 | 14.4 |
| Comp. Ex. #13 | 0 | 0 | 0 | 0 | 1.95 | 0.0078 | 0.52 | 0.00208 | 0 | 0 | 95.4 | 24.6 |
| Comp. Ex. #14 | 0 | 0 | 1.73 | 0.00692 | 1.95 | 0.0078 | 0 | 0 | ∞ | 0 | 90.7 | 16.4 |
| Comp. Ex. #15 | 3.25 | 0.013 | 1.3 | 0.0052 | 0.98 | 0.00392 | 0.13 | 0.00052 | 10 | 3.32 | 93.3 | 17 |
| Comp. Ex. #16 | 3.25 | 0.013 | 0.43 | 0.00172 | 0.98 | 0.00392 | 0.39 | 0.00156 | 1.10 | 3.32 | 96.8 | 16.6 |
| Comp. Ex. #17 | 4.88 | 0.01952 | 0.86 | 0.00344 | 0.49 | 0.00196 | 0.26 | 0.00104 | 3.31 | 9.96 | 96.2 | 15.2 |
| Comp. Ex. #18 | 1.63 | 0.00652 | 0.86 | 0.00344 | 1.46 | 0.00584 | 0.26 | 0.00104 | 3.31 | 1.12 | 96.8 | 16.2 |

The aforementioned catalysts were installed respectively to an exhaust system of an engine bench on which a V-type 8-cylinder 4.3-L engine was mounted, and then a durability test was carried out, durability test in which they were held for 50 hours under such conditions that the inlet gas temperature was 900° C. and an A/F was oscillated between 15 and 14 at 1 Hz.

The catalysts after the durability test were installed respectively to an exhaust system of an engine bench on which an inline 4-cylinder 2.4-L engine was mounted, and then combustion was performed with the theoretical air-fuel ratio until the catalyst inlet-gas temperature became 400° C. Thereafter, while holding the catalyst inlet-gas temperature at 400° C. with a heat exchanger, they underwent sweeping from A/F=13.5 to A/F=15 at a rate of A/F=0.01/sec. (ΔA/F=±0.5, and 0.5 Hz). The conversion rates of HC, $NO_x$ and CO at this time were measured continuously, thereby finding a maximum conversion rate (COP) at which these three components could be purified simultaneously, that is, a conversion rate that corresponded to a point at which the conversion rate curves of the three components crossed one another.

Moreover, after performing combustion with the theoretical air-fuel ratio until the catalyst inlet-gas temperature became 400° C., the catalysts were cooled to 50° C. by means of bypass switching, and a time was measured, time which was required for the HC conversion rate to become 50% when an exhaust gas was thereafter introduced into them (50%-HC attainable time).

These results are illustrated in FIGS. 2-5. In FIGS. 2-5, curves, which connect equivalent numeric-value ranges according to the isobaric curve or contour line, are also shown graphically.

Figure 2:
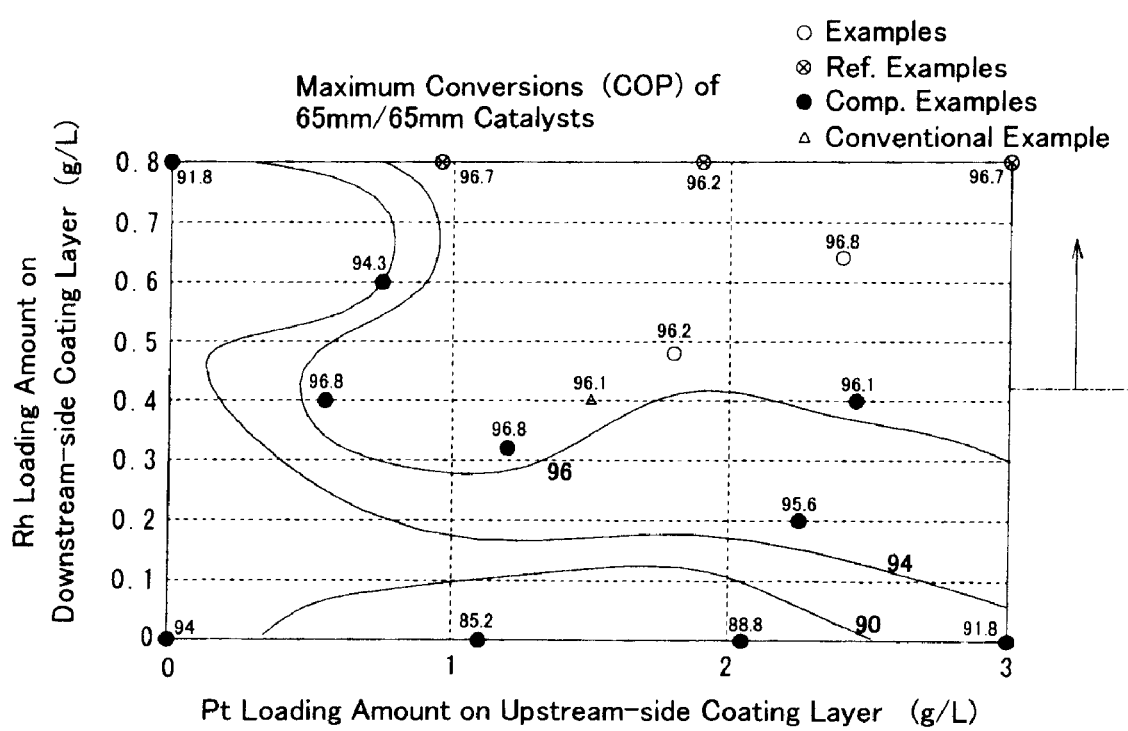
FIG. 2 is a graph for illustrating maximum conversion rates with respect to downstream-side Rh loading amounts and upstream-side Pt loading amounts in catalysts in which their coating layers were coated distinctively for their 65 mm upstream sides and 65 mm downstream sides.

From FIG. 2, it is understood that those that exhibited higher maximum conversion rates than Conventional Example did were in the cases where the downstream-side Rh loading amount was 0.42 g/L or more substantially. Since a ratio of the Rh loading amount on the upstream side with respect to the Rh loading amount on the downstream side was 0.9 in this case, it is apparent that it is desirable to make this ratio 0.9 or less. Moreover, from FIG. 4 as well, it is understood that this range is preferable.

On the other hand, by means of comparing Comparative Example No. 1 with Comparative Example No. 2, comparing Comparative Example No. 3 with Comparative Example No. 4, or comparing Comparative Example No. 7 with Comparative Example No. 8, it is apparent that the 50%-HC purification attainable times were shorter when the upstream-side Pt loading densities were higher than the downstream-side Pt loading densities than when being the opposite.

Moreover, the catalyst according to Example No. 1 exhibited a shorter 50%-HC attainable time than Conventional Example did, and accordingly was good in terms of the purifying performance in low-temperature region. And, from FIG. 3, it is understood that there was a domain where the 50%-HC attainable times were shorter than that of Conventional Example, and the domain was included in the aforementioned preferable range. However, from FIG. 3, it is preferable that the upstream-side Pt loading amount can fall in a range of about 1.3 g/L-about 2.7 g/L, and can especially desirably fall in a range of about 2 g/L-about 2.7 g/L. This corresponds to that a ratio of the Pt loading amount on the upstream side with respect to the Pt loading amount on the downstream side can be about 0.83-about 2.37, can desirably be about 1.48-about 2.37.

Figure 3:
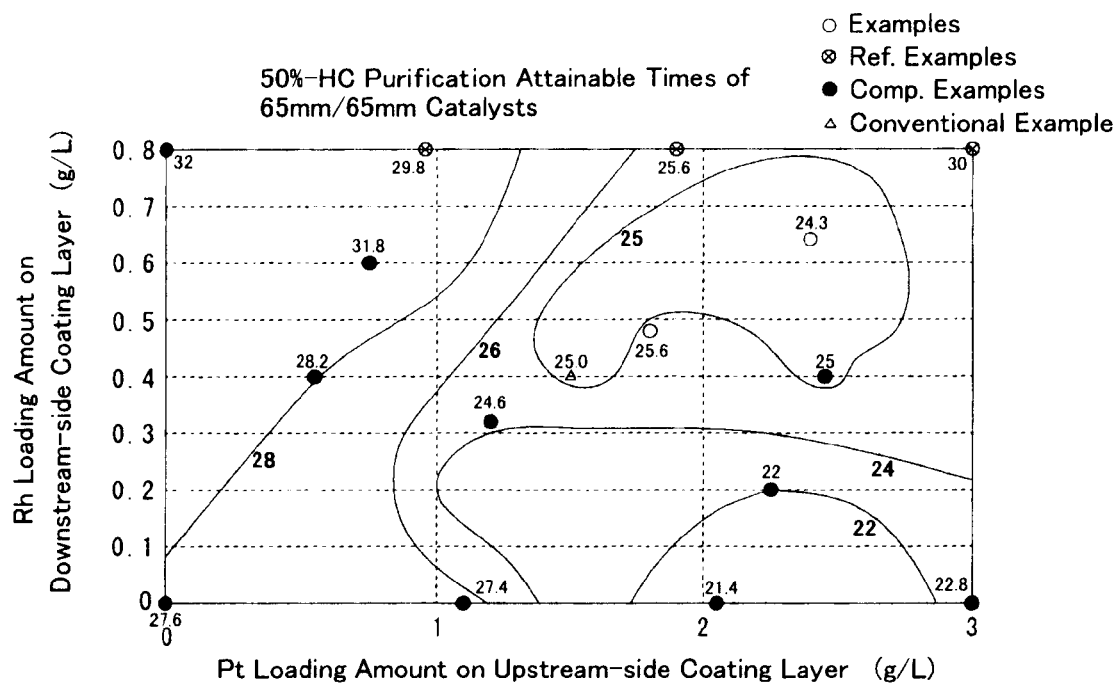
FIG. 3 is a graph for illustrating 50%-HC attainable times with respect to downstream-side Rh loading amounts and upstream-side Pt loading amounts in catalysts in which their coating layers were coated distinctively for their 65 mm upstream sides and 65 mm downstream sides.
Figure 4:
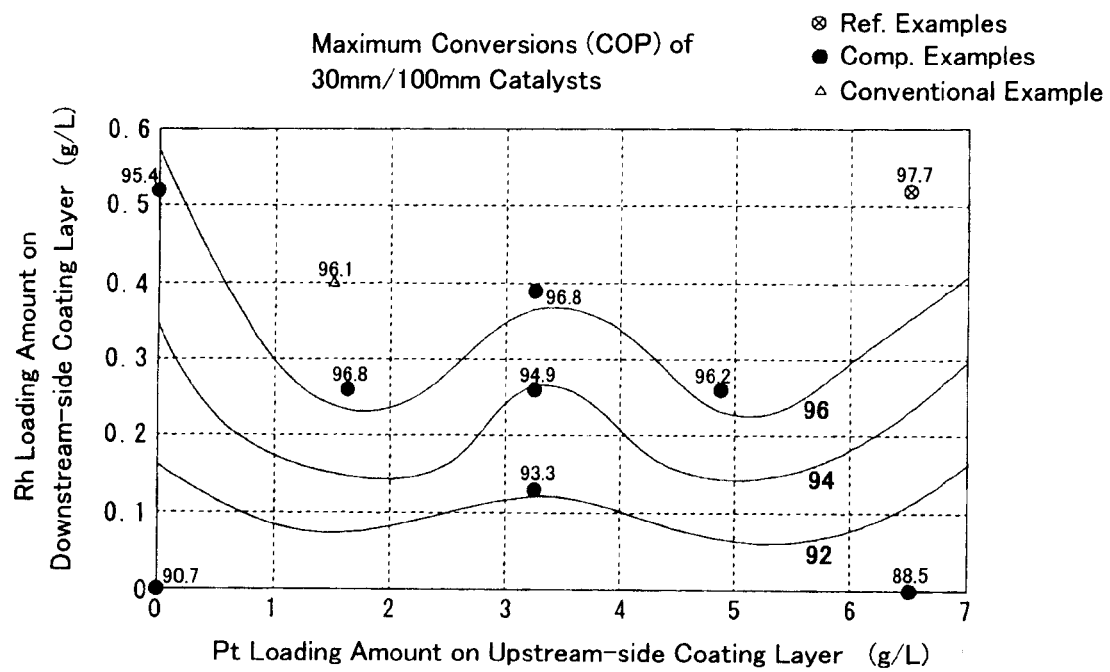
FIG. 4 is a graph for illustrating maximum conversion rates with respect to downstream-side Rh loading amounts and upstream-side Pt loading amounts in catalysts in which their coating layers were coated distinctively for their 30 mm upstream sides and 100 mm downstream sides.

Moreover, from FIG. 3, it is understood that the downstream-side Rh loading amount can be about 0.52 g/L or more. A ratio of the Rh loading amount on the upstream side with respect to the Rh loading amount on the downstream side is about 0.54 in this case, and it is understood that the ratio of the Rh loading amount on the upstream side with respect to the Rh loading amount on the downstream side can further preferably be 0.54 or less.

Figure 5:
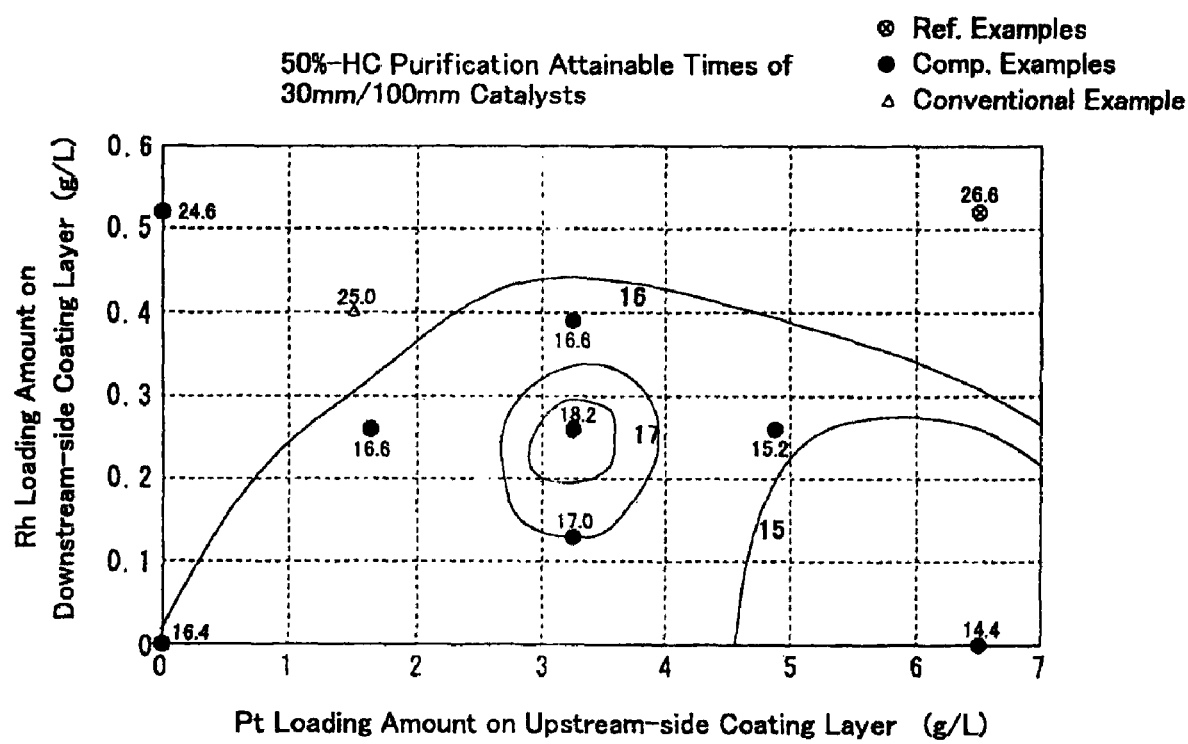
FIG. 5 is a graph for illustrating 50%-HC attainable times with respect to downstream-side Rh loading amounts and upstream-side Pt loading amounts in catalysts in which their coating layers were coated distinctively for their 30 mm upstream sides and 100 mm downstream sides.

Note that, from FIG. 5, it is difficult to distinguish preferable loading amounts definitely. This is believed as follows: the influence, which resulted from granular growth that occurred in Pt during the durability test, was great when Pt was loaded with high density in such a short upstream-side range as 30 mm.

The invention claimed is:

1. A catalyst for purifying exhaust gas, comprising:
a substrate; and
a coating layer formed on a surface of the substrate,
wherein the coating layer comprises
a porous oxide support; and
noble metals loaded on the porous oxide support, the noble metals including Pt and Rh;
wherein the Pt is loaded in an amount exceeding 0.75 g per 1 liter of the substrate on an exhaust-gas upstream side of the coating layer; and a loading density of the Rh in the coating layer is higher on an exhaust-gas downstream side than on the exhaust-gas upstream side.

2. A catalyst for purifying exhaust gas, comprising:
a substrate; and
a coating layer formed on a surface of the substrate,
wherein the coating layer comprises
a porous oxide support; and
noble metals loaded on the porous oxide support, the noble metals including Pt and Rh;
wherein the Pt is loaded in an amount exceeding 0.75 g per 1 liter of the substrate on an exhaust-gas upstream side of the coating layer; and a loading density of the Rh in the coating layer is higher on an exhaust-gas downstream side than on the exhaust-gas upstream side, and
wherein a ratio of a loading amount of Rh on the exhaust-gas upstream side with respect to a loading amount of Rh on the exhaust-gas downstream side is 0.9 or less.

3. The catalyst for purifying exhaust gas set forth in claim 2, wherein the ratio of the loading amount of Rh on the exhaust-gas upstream side with respect to the loading amount of Rh on the exhaust-gas downstream side is 0.5 or less.

4. A catalyst for purifying exhaust gas, comprising:
a substrate; and
a coating layer formed on a surface of the substrate,
wherein the coating layer comprises
a porous oxide support; and
noble metals loaded on the porous oxide support, the noble metals including Pt and Rh;
wherein the Pt is loaded in an amount exceeding 0.75 g per 1 liter of the substrate on an exhaust-gas upstream side of the coating layer; a loading density of the Rh in the coating layer is higher on an exhaust-gas downstream side than on the exhaust-gas upstream side; and a loading density of Pt in the coating layer is higher on the exhaust gas upstream side than on the exhaust-gas downstream side.

5. The catalyst for purifying exhaust gas set forth in claim 4, wherein a ratio of a loading amount of Pt on the exhaust-gas upstream side with respect to a loading amount of Pt on the exhaust-gas downstream side is 0.8 or more.

6. The catalyst for purifying exhaust gas set forth in claim 5, wherein the ratio of the loading amount of Pt on the exhaust-gas upstream side with respect to the loading amount of Pt on the exhaust-gas downstream side is 1.4 or more.

* * * * *